3,188,351
RECOVERY OF A CARBONYL COMPOUND
OF COBALT
Hans Lemke, 10 Rue de Champagne, Asnieres, France
Filed Jan. 24, 1963, Ser. No. 253,694
Claims priority, application France, Dec. 17, 1958,
782,064
17 Claims. (Cl. 260—604)

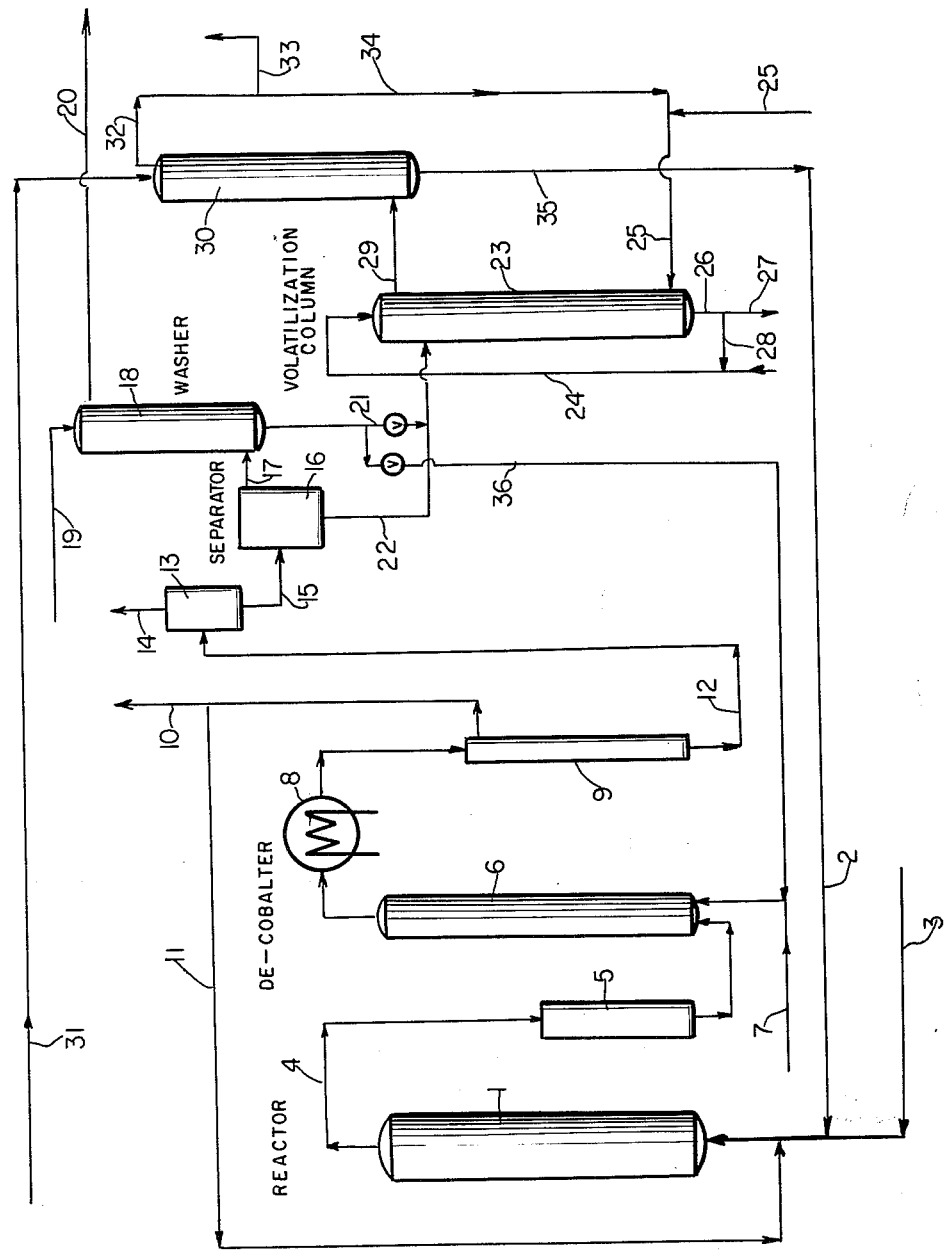

This application is a continuation-in-part of my copending United States patent application Serial No. 859,571, filed December 15, 1959, and now abandoned.

The present invention relates to improvements in the process for the manufacture of organic products by the OXO synthesis. It more particularly relates to an improved catalyst cycle wherein a cobalt catalyst is employed.

It is well known that ethylene linkages can fix carbon monoxide and hydrogen so as to form oxygenated compounds, such as aldehydes. This hydroformylation reaction, known as the OXO synthesis or reaction, can be shown diagrammatically as follows:

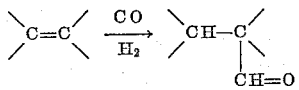

An important industrial application of this reaction resides in the manufacture of primary alcohols by means of hydrogenation of the aldehydes which are derived from this synthesis.

In the above reaction, the fixation of the carbon monoxide and hydrogen on the double bond is effected by means of a catalyst which is preferably a cobalt compound. Although the cobalt may be introduced into the hydroformylation reactor in very different forms, for example as the metal, oxide, hydroxide, carbonate, salt of a mineral or organic acid; cobalt hydrocarbonyl,

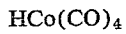

must be considered as the effective catalyst of the OXO reaction, since this latter compound is formed under the conditions of the synthesis, independently of the nature of the cobalt employed. As cobalt hydrocarbonyl,

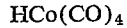

and other carbonyl compounds of cobalt are soluble in the organic medium, both in the starting materials and in the products of the reaction, the OXO synthesis is then a homogeneous catalytic process, which involves the need to eliminate the catalytic element from the product of reaction and to restore the said catalytic element to the process in a suitable manner. It is thus necessary to establish a catalyst cycle and, by reason of the fairly high cost of cobalt and the costs involved in extracting and recycling the catalyst, the result of the commercial exploitation of the OXO process depends to a large extent on the methods applied in the establishment of the catalyst cycle.

My invention has for its main object to provide a new catalyst cycle which enables an especially advantageous use of the OXO process to be applied on an industrial scale.

A further object of this invention is to provide a catalyst recovery process for a reaction having a cobalt catalyst in the form of a carbonyl thereof wherein the catalyst may be recovered and recycled to the reaction in nearly quantitative recovery, and in a continuous, convenient manner.

Another object of my invention is to provide a catalyst cycle for a hydroformylation reaction employing a cobalt carbonyl catalyst wherein the cobalt is kept in the cobalt carbonyl form and in the form of a compound which is either water soluble or in gaseous state during the entire recovery process.

A further object of my invention is to provide a process for recovery of a carbonyl compound of cobalt present in a water-insoluble organic liquid comprising intimately contacting the organic liquid having a carbonyl compound of cobalt present therein with an aqueous medium containing at least one substance selected from the group consisting of the oxides, hydroxides and salts of the alkali and alkaline earth metals to form a water soluble cobalt compound which has the cobalt present substantially entirely in the anionic portion of the molecule and dissolves in the aqueous medium, separating the aqueous medium containing the dissolved cobalt compound from the organic liquid, adding a strong acid to the aqueous medium to produce an aqueous mixture including a carbonyl compound of cobalt, and separating said carbonyl compound of cobalt from the aqueous mixture.

These and other objects of the invention will become more apparent as the description thereof proceeds.

A large number of methods have already been suggested in the prior art for the extraction of the cobalt from the products of the OXO reaction and for recycling the recovered cobalt into the synthesis circuit.

As regards the extraction, these methods exhibit two main tendencies:

(1) Destruction of the cobalt carbonyl complex by different means such as heat, steam, hydrogen at a high temperature, moderate oxidation, mineral or organic acids, and the separation of the cobalt in the form of metal, oxide, hydroxide, carbonate or mineral or organic salts;

(2) Conservation of the cobalt carbonyl complex by extraction with water containing, if desired, an organic acid or an organic salt of cobalt, and by separation of the cobalt carbonyl compound formed, Co[Co(CO)₄]₂ by virtue of its solubility in water, such as disclosed in U.S. Patent 2,744,936, for example.

The method of recycling the catalyst is dependent to a large extent on the process of extraction with the result that there may be the following possibilities:

(a) In the case where the cobalt carbonyl complex has been destroyed, the active catalyst must be formed afresh, either inside the hydroformylation reaction or outside the reactor, starting from materials obtained during the process of de-cobaltation.

(b) In the case where the cobalt carbonyl complex has been extracted with water, containing, if desired, an organic acid or an organic salt of cobalt, it has been suggested to recycle the aqueous solution directly into the hydroformylation reactor.

The cycle described under (1) and (a) has the great drawback that the active form of the catalyst is destroyed during the de-cobaltatation and that, in order to reconstitute the active form, the separated cobalt must be converted to a compound which permits an easy conversion to carbonyls under the conditions of the OXO synthesis. The establishment of such a recycling process necessitates a large number of physical and chemical operations which make the catalyst cycle difficult and costly to establish.

With regard to the cycle described under (2) and (b) with respect to the extraction phase, this has the advantage of retaining the cobalt partially in the form of a carbonyl compound; however, in the compound Co[Co(CO)₄]₂ one-third of the cobalt is not in carbonyl form. Difficulties are however encountered in carrying out the recycling operation since, by reason of the carbonyl compound formed during the de-cobaltation being in an aqueous solution, direct recycling of this solution into the hydroformylation zone, as it has been suggested, makes it necessary to carry out the OXO reaction in the persence of water, that is to say, in the heterogeneous phase. It is now well known that the reaction rate decreases considerably if the OXO synthesis is carried out in the presence of water for the cobalt catalyst is shared between the aqueous and organic phases. In order to avoid this heterogeneous phase in the OXO reaction, it has already been proposed to destroy the cobalt carbonyl compound contained in the aforesaid aqueous solution, then to convert the cobalt by suitable chemical agents to salts of fatty acids which are soluble in the olefins and to recycle the cobalt in this form. It is evident that, although the method which employs water or aqueous solution as the extraction agent, enables the cobalt to be partially extracted from the OXO product in the form of a carbonyl compound, it does not succeed in recycling this compound into the olefins to be treated, in a satisfactory manner.

By reason of the importance of the cobalt cycle in the economic exploitation of the OXO process, the method forming the object of the invention indicates a new process of de-cobaltation of the products of reaction of the OXO synthesis which provides a convenient and complete recycling of the extracted cobalt into the hydroformylation zone. The method has for its object to conserve substantially the whole of the cobalt during the entire catalyst cycle, in the form of a carbonyl complex $[Co(CO)_4]$, and to enable substantially the whole of the cobalt to be recycled in the form of hydrocarbonyl, starting from the said complex.

It is known that the cobalt contained in dissolved form in the products obtained from the hydroformylation reactor cannot be volatilized directly in the form of gaseous hydrocarbonyl when it is treated under the conditions which permit the volatilization of the cobalt dissolved in the form of carbonyl compounds in neutral hydrocarbons. Thus, for example, if a mixture of carbon monoxide and hydrogen is passed through a solution of dicobalt-octacarbonyl $Co_2(CO)_8$ in decane, xylene or decaline, at a pressure of 100 kg. per sq. cm. and at a temperature of 100° C., the cobalt is carried away with the gas in the form of hydrocarbonyl $HCo(CO)_4$, and the hydrocarbon can be completely freed from the dissolved cobalt. However, by operating in the same way with the products obtained from the OXO reaction and containing the cobalt in a suitable proportion in the form of carbonyl compounds, it has been found that the cobalt is not volatilized. There is reason to assume that the cobalt carbonyl compounds form a complex with certain organic compounds contained in the product of the OXO reaction.

I have found that it is possible to recover the cobalt by volatilization. After the completion of the hydroformylation reaction, the hydroformylation product of reaction is put into contact with a suitable metal or oxide or metallic salt. If such a metal or oxide or salt is put into contact with the product of reaction, there is formed a carbonyl compound of cobalt which also contains the metal employed. If this operation is carried out in the presence of water, the carbonyl compound formed passes substantially wholly into the aqueous medium, and the organic product of the reaction, in which the carbonyl compound formed is insoluble or at most only slightly soluble, is freed from the cobalt. I have shown that, after the separation of the aqueous layer containing the extracted cobalt, it is possible to volatilize cobalt from that solution in the form of hydrocarbonyl, by treating it with a mineral acid and by entraining the freed cobalt hydrocarbonyl by a current of a gas inert to the hydrocarbonyl. Other methods of separation of the cobalt in the form of hydrocarbonyl from the acidulated aqueous solution can also be employed, such as, for example, contacting the acidulated aqueous solution containing cobalt in the form of hydrocarbonyl with an olefinic compound utilized as a feed stock or other organic solvent wherein the cobalt in the form of hydrocarbonyl is extracted or absorbed from the aqueous solution into the organic liquid.

With regard to the effect of the extraction and recycling of the cobalt extracted, it has been recognized that the efficiency of the cycle depends on the nature of the chemical agent which enters into reaction with the carbonyl compound contained in the OXO product. In order to obtain a complete extraction, the carbonyl compound formed should be soluble in water and practically insoluble in the OXO product and, in order to arrive at a total conversion of the extracted cobalt to hydrocarbonyl, it is necessary that the carbonyl compound formed should contain the cobalt exclusively in the form of the carbonyl complex $[Co(CO)_4]$.

It has been found that compounds containing alkali metals or alkali earth metals are particularly suitable for these requirements. The method forming the object of the invention preferably employs compounds of alkali metals such as sodium or potassium, or alkaline earth metals such as calcium or magnesium by reason of their comparatively low cost; but compounds of lithium, beryllium, strontium and barium are also suitable. The metals referred to can be employed in very varied forms provided that they can neutralize the acidic reacting carbonyl compounds of cobalt present in the OXO product, for example, as oxides, hydroxides, or as salts with weak acids and other alkaline reacting salts when dissolved in water, such as, for example, disodium phosphate. It is especially favorable to make use of carbonates or bicarbonates. However, the formates and oxalates are also useful. Metals which have no reaction with water, such as magnesium, can also be employed in the metallic state.

The compounds referred to above play a decisive part in the new cycle now considered, because, when carrying out the extraction of the OXO products by water alone, either at atmospheric pressure or under pressure, the cobalt appears in the aqueous solution in the from of $Co[Co(CO)_4]_2$, and by treating this solution with a mineral acid it is only possible to convert to hydrocarbonyl the cobalt which is present in the carbonyl complex $[Co(CO)_4]$ which amounts to only two-thirds of the total cobalt. The remainder of the cobalt which exists outside the complex enters into reaction with the acid to form a salt and leaves the cycle of cobalt carbonyl. On the other hand, in the case, according to the present invention, in which the extraction of the OXO product is carried out in the presence of a compound of the alkali or alkaline-earth group, compounds are formed which contain these metals in the cation form, and substantially the whole of the cobalt is present in the anionic part of the compound and is completely convertible to hydrocarbonyl by the action of the mineral acid.

Based on the above observations, the method which forms the object of the present invention and which is an improvement in the OXO synthesis, consists essentially in recycling the cobalt catalyst dissolved in the products of the hydroformylation reaction by making the cobalt capable of being substantially wholly volatilized by action of a metal or an oxide or a metallic salt employed at the end of the hydroformylation process. In accordance with this method, the product resulting from the OXO synthesis and containing carbonyl compounds of cobalt in the dissolved state is treated, preferably in the presence of carbon monoxide and hydrogen, by water and a compound of an alkali or alkaline earth metal. The aqueous layer containing the cobalt carbonyl compound formed is then decanted, the aqueous solution is treated with a strong mineral acid, the cobalt hydrocarbonyl is carried away in volatile form by an inert gas.

The temperature of the treatment of the compounds resulting from the OXO synthesis for the preparation of the cobalt carbonyl compound is maintained between about 20 and 250° C., and preferably about 40 to 160° C. The pressures may range from atmospheric upward and are only limited by the apparatus since there is no critical upper limit. The pressure may be between atmospheric and 500 kg. per sq. cm., and can be chosen with advantage at about 10 to 150 kg. per sq. cm.

The quantity of chemical agent to be added must at least correspond to the stoichiometric quantity of cobalt present in the product of hydroformylation for highest cobalt recovery. It is useful to operate with a slight excess; even a large excess does not cause any difficulty.

The quantity of water to be used depends on the solubility of the carbonyl compound formed and on the apparatus in which the process is effected. It is generally chosen between 10 and 100 percent of the volume of the organic products to be treated.

The gas present during the treatment of elimination of the cobalt is a mixture and contains mainly carbon monoxide and hydrogen in any ratio. For example, the gas known generally as water-gas, may be used, or spent gases from the OXO synthesis.

For the treament of the aqueous layer containing the cobalt in the form of the cobalt carbonyl compound, it is possible to employ the strong mineral acids, such as for example sulfuric acid, hydrochloric acid, phosphoric acid, etc.

The cobalt hydrocarbonyl formed can be carried away by a flow of a gas inert to the hydrocarbonyl such as nitrogen, carbon monoxide, hydrogen or carbon dioxide, or mixtures of gases, for example.

The treatments with acid and inert gas may take place at ambient temperature and atmospheric pressure. However, lower or higher temperatures and pressures may be used as long as the conditions do not decompose the cobalt hydrocarbonyl.

The cobalt hydrocarbonyl in the gaseous state in the gas inert to the hydrocarbonyl may be recycled to the hydroformylation reaction by a number of methods. It is preferable to absorb the same in the liquid olefinic feed stock which can then be passed into the hydroformylation reactor under conditions of OXO synthesis. It is also possible, however, to absorb the cobalt hydrocarbonyl in a solvent, preferably one which is inert to the conditions of the hydroformylation reaction. If desired, the gas containing cobalt hydrocarbonyl can be either condensed and recycled or pumped directly into the hydroformylation reactor.

The organic materials for the OXO synthesis are compounds containing double bonds which may be submitted to the OXO reaction, for example, an olefinic hydrocarbon.

The method according to the invention can be carried out either with continuous or non-continuous working. In the industrial process, columns operating in counterflow are particularly suitable. The contact between the various materials can be effected in many ways, for example, it is possible to effect the OXO synthesis itself already in the presence of the de-cobaltation agent and then to treat the product of reaction with water. It is also possible to flow the OXO reaction product with water over a solid de-cobaltation agent arranged in a fixed bed, for example over marble, dolomite or magnesium shavings, or alternatively the OXO product can be put into contact with water containing the active chemical substance dissolved or in suspension, through a packed column.

During the transfer of the free cobalt hydrocarbonyl into the olefins or organic solvent, it is also possible to put the latter directly into contact with the acidulated aqueous solution. Furthermore, the hydrocarbonyl may be dissolved first in a solvent such as aromatic or saturated hydrocarbons, alcohols, distillation residues and other products of the OXO synthesis, after which the mixture is recycled to the reaction zone. Generally, the hydrocarbonyl is adsorbed in the olefin feed stock.

The invention may be better understood by reference to the drawing which illustrates a flow diagram of the process.

Referring to the drawing, the following describes one preferred embodiment of the invention on an industrial scale.

The hydroformylation reactor is 1, where hydroformylation occurs at a pressure of 150 to 350 kg./cm.$^2$ and at a temperature of from 120° to 180° C. For every liter of reactor volume, 0.2 to 2 liters/hr. of an olefin, containing per liter 0.2 to 10 grams of cobalt in the form of hydrocarbonyl or of dissolved carbonyl, are conveyed by piping 2, while piping 3 conveys 0.2 to 2 m.$^3$/hr. of a gaseous mixture containing carbon monoxide and hydrogen in the ratio of from 0.5 to 1.0.

The reaction product and the residual gas leave the hydroformylation reactor through tubing 4, pass through an exchanger 5, and enter reactor 6, where the de-cobaltation occurs at a pressure of from 10 to 350 kg./cm.$^2$ and at a temperature of from 40 to 200° C.

An aqueous solution of sodium carbonate is introduced, at the rate of from 0.2 to 0.6 liter per liter of hydroformylation product, into the reactor through piping 7. The aqueous solution contains a certain excess of sodium carbonate over the amount required to change cobalt hydrocarbonyl into the sodium salt of cobalt hydrocarbonyl.

The liquid and gaseous products leave the de-cobalter, pass through a cooler 8, and are led into a separator 9, where the residual gas is removed through piping 10. If desired, a portion of this gas can be recycled, through piping 11, into the hydroformylation reactor 1. The liquid products, now free of most of the gas, are conveyed by piping 12 into separator 13, where they are submitted to a reduced pressure of from 1 to 20 kg./cm.$^2$. The expended gas escapes through duct 14, and the liquid products are drawn from the degasser through pipe 15. The separation of the organic product from the aqueous product occurs in decanter 16. The organic layer, still containing a certain amount of the sodium salt of cobalt hydrocarbonyl, is conveyed by pipe 17 to a washing means 18 supplied with water by tube 19. The hydroformylation product, freed of cobalt, leaves the washer through pipe 20 to be conveyed to such transformation installations as hydrogenation or oxidation, not shown.

The aqueous layer in decanter 16 is drawn off through tube 22 into which opens tube 21 conveying the washing water from washer 18. If desired, a part or all of the washing water from washer 18 can be recycled to de-cobaltation reactor 6, as shown by piping 36. The aqueous extract of the hydroformylation product, containing cobalt in the form of the sodium salt of cobalt hydrocarbonyl, is conveyed to a column 23, where the cobalt is volatilized at a pressure of from 1 to 20 kg./cm.$^2$ and a temperature of from 0° to 50° C. by reacting the sodium salt of cobalt hydrocarbonyl with an aqueous solution of sulfuric acid introduced by conduit 24. The quantity of acid introduced is adjusted so that, within the column, the concentration at the inlet is held to from 40 to 100 g. H$_2$SO$_4$ per liter and at the outlet from 5 to 40 g. H$_2$SO$_4$ per liter. The aqueous solution leaving the column, by pipe 26, contains free acid, sodium sulphate, and a very small amount of cobalt sulphate.

A portion of this aqueous solution is removed from the circuit by pipe 27, and another portion is recycled, by tubing 28, into the volatilizing column 23, after adding concentrated sulfuric acid for the purpose of adjusting the acidity. The cobalt hydrocarbonyl liberated by the action of the acid is carried from the volatilization column 23 by an inert gas which preferably contains carbon monoxide and is introduced into the column through tube 25 at the rate of from 50 to 500 liters per liter of aqueous solution. The carrier gas charged with cobalt hydrocarbonyl leaves column 23 through duct 29 and is conveyed to column 30, where the volatilized cobalt is absorbed by the hydroformylation olefin or other solvent at a pressure of from 1 to 20 kg./cm.$^2$ and a temperature of from 10° to 30° C.

The olefin or organic solvent in which the cobalt hydrocarbonyl is dissolved is introduced into column 30 by pipe 31 and leaves through pipe 35. The gas freed of cobalt hydrocarbonyl escapes from the column 30 through tubing 32. A portion of the gas is vented by pipe 33 to maintain constant composition, and another portion is recycled into the volatilization column 23 by pipe 34.

The catalyst cycle is completed by conveying the olefin or the solvent containing a cobalt carbonyl or hydrocarbonyl through pipe 2 into the hydroformylation reactor 1.

The small cobalt losses in the cycle can be made up by adding new cobalt in the form of fatty acid salts dissolved in the olefin or in other suitable form.

The following specific examples are provided to further illustrate the invention and to enable persons skilled in the art to better understand and practice the invention and are not intended to be limitative.

EXAMPLE I

The following example illustrates a commercial embodiment of the process.

At a pressure of 180 kg./cm.$^2$ and a temperature of from 165° to 170° C., 2700 liters/hr. of propylene trimers containing, per liter, 2.9 grams of cobalt in the form of carbonyl, and 1200 m.$^3$/hr. of a gaseous mixture containing 38.2% carbon monoxide and 56.3% hydrogen, the remainder being carbon dioxide and nitrogen, were passed through a reactor. The liquid and gaseous products were removed at the top of the hydroformylation reactor and directly introduced at the base of the de-cobalter.

Into the de-cobaltation reactor there was pumped 650 liters/hr. of an aqueous solution of sodium carbonate containing 20 g. of $Na_2CO_3$ per liter. The products removed at the top of the de-cobalter were cooled to 20° to 30° C. in passing through a cooler and then collected in a separator, where there occurred a separation of residual gas containing 35.4% carbon monoxide, 46% hydrogen, and 11% carbon dioxide, the remainder being nitrogen. The liquid products located at the bottom of the separator were drawn off and conveyed into a decanter exposing them to a pressure of about atmospheric. The organic product running off at the top, still containing from 100 to 500 p.p.m. of cobalt in the form of the sodium salt of cobalt hydrocarbonyl, was continuously washed in a two-stage washer fed with water. The hydroformylation product leaving the washer, and containing from 3 to 5 p.p.m. of cobalt, was conveyed to the hydrogenation apparatus. The aqueous extract coming from the decanter and the wash water from the washer were brought together and introduced at the top of a volatilization column. To release the cobalt hydrocarbonyl, 1500 liters/hr. of sulfuric acid containing 34 g. of $H_2SO_4$ per liter were pumped into the volatilization column at its top. At the base of the column, 3250 liters/hr. of an aqueous solution containing 13 g. of $H_2SO_4$ per liter are obtained.

Of this solution, 1500 liters/hr. were recycled in the volatilization column after adding 32 kg./hr. of concentrated sulfuric acid, and 1750 liters/hr. were removed. The amount of cobalt in this latter was less than 100 p.p.m. of cobalt. The cobalt hydrocarbonyl given off by the action of the acid was withdrawn from the column by an inert gas, introduced at the base of the column and rising from the bottom to the top of the column, said gas containing 29% carbon monoxide, 56% hydrogen, and 9% carbon dioxide, the remainder being nitrogen.

The inert carrier gas charged with cobalt hydrocarbonyl was introduced at the base of an absorption column. Two thousand seven hundred liters/hr. of propylene trimers, intended for the hydroformylation, were introduced at the top of the column; the cobalt hydrocarbonyl dissolves in the olefin, and the carrier gas, practically free of the cobalt, leaves the column. Of this gas, a portion was recycled into the volatilization column. The propylene trimers, containing, per liter, about 2.8 g. of cobalt in the form of carbonyls, were sent to the hydroformylation reactor.

The consumption of raw materials per 1000 kg. of isodecyl alcohol produced was

> 10 kg. of sodium carbonate,
> 27 kg. of sulfuric acid and
> 0.25 kg. of cobalt oxide.

Thus, the recovery of cobalt hydrocarbonyl catalyst was on the order of 97% under the above conditions.

EXAMPLE II.—DE-COBALTATION WITH A SOLUTION OF SODIUM FORMATE

A 600 g. sample of the hydroformylation product formed from propylene trimers in the industrial process of Example I and containing 1.41 g. of cobalt per kilogram, were placed in an autoclave having a volume of 2.3 liters. After addition of 220 g. of a sodium formate solution at 21.4 g./l. (0.315 N), the autoclave was submitted to a temperature of 180° C. and a pressure of 150 kg./cm.$^2$ for 1 hour.

After decantation the organic phase contained 0.040 g. Co/kg. and the acqueous layer contained 3.25 g. of Co/kg. After acidification, 91.3% of the cobalt contained in the aqueous solution could be volatilized.

EXAMPLE III

Olefins having 6 to 7 carbon atoms were submitted to a hydroformylation reaction as in Example I. A 641 g. sample of this industrial product containing 1.65 g. Co/kg. was added directly to a closed vessel having a volume of 1 liter and containing 100 cc. of a solution of sodium carbonate at 20 g./l. The addition took place with agitation during 20 minutes, after which agitation was continued for 10 minutes. The temperature was maintained at 30° C. and the pressure was atmospheric.

After decantation the organic phase contained 0.330 g. Co/kg. The aqueous phase contained 3.95 g. Co/kg. After acidification, 92% of the cobalt in the aqueous solution was recovered.

EXAMPLE IV

In accordance with Example III, 200 g. of the hydroformylation product of Example III were reacted with 100 cc. of a solution of sodium hydroxide at 8 g./l.

After decantation, the organic phase contained 0.283 g. Co/kg.

The aqueous phase contained 3.10 g. Co/kg. of which 97.7% could be recovered as hydrocarbonyl.

EXAMPLE V

In a high-pressure autoclave of nickel-chromium-molybdenum steel having a capacity of 2 liters, there were placed 205 grams of a product obtained from the hydroformylation of a mixture of octene isomers and containing 0.204 gram of cobalt in dissolved form. After the addition of 250 cu. cm. of distilled water and 0.465 gram of calcium carbonate, the autoclave was closed, purged with nitrogen and put under a pressure of 90 kg. per sq. cm. by a gas having the composition: 3.6% $CO_2$, 35.4% CO, 59.0% $H_2$ and 2% $N_2$. After the stirrer device had been started up, the contents of the autoclave were heated to 140° C. by means of an oil bath, and this temperature was maintained for one hour. The pressure became stable at 121 kg. per sq. cm. and fell to its initial value after cooling to the ambient temperature. After releasing the gas, the products were then drawn-off from the autoclave by means of a plunger. Care was taken to leave them under the atmosphere of the gas of reaction. The organic layer had a slightly yellow color and after washing with water gave a cobalt content of 9 milligrams per kg. The aqueous layer appeared in the form of a white suspension. By treating a portion of the latter with bromine, a content of 198 milligrams of cobalt was determined for the whole of the aqueous layer, which corresponds to a recovery of 97% of the cobalt employed.

EXAMPLE VI 200 cu. cm. of the aqueous layer obtained from Example V were placed in a cylindrical glass container provided at its lower portion with a means for introducing a gas, and at its upper portion with two small orifices intended respectively for the introduction of acid and for the outlet of the purge gas. After the addition of 17 cu. cm. of 10% sulfuric acid, the freed cobalt hydrocarbonyl was entrained by a current of nitrogen. The cobalt thus carried away was absorbed in two bubbling apparatus each filled with 90 grams of octene isomers. The absorption of the cobalt hydrocarbonyl in the olefin essence was shown by a progressive coloration towards brown. After this bubbling stage the nitrogen was free from cobalt. At the end of the entrainment by nitrogen, a content of 2 milligrams of cobalt per kg. was found in the aqueous solution.

EXAMPLE VII 1 liter per hour of an OXO product containing 3.6 grams of cobalt per kg. (injection into the bottom of the tube) and 0.5 liter of water containing 10 grams of sodium bicarbonate per kg. (injection into the top of the tube) were passed counter-currently, under a pressure of 150 kg. per sq. cm. of water gas, through a tube packed with steel coils and heated to 140° C. An overflow system combined with a separator, intended to maintain a certain level in the reactor, made it possible to draw off from the bottom of the tube the water charged with cobalt carbonyl compounds. The treated organic product leaving the top of the reactor through a plunging tube was then collected in a further separator.

The cobalt content in the treated OXO product was thus reduced to 30 milligrams per kg.

By carrying out a treatment with sulfuric acid on the water containing the extracted cobalt, it was possible to volatilize 95% of the cobalt in the form of hydrocarbonyl which could be absorbed by an olefinic hydrocarbon.

EXAMPLE III.—EFFICIENCY OF THE CATALYST CYCLE

Treatment of the product of the OXO synthesis (a) By water alone: 600 grams of nonene isomers were charged with cobalt up to a concentration of 2.1 grams per kg. by bubbling carbon monoxide containing cobalt hydrocarbonyl, and this olefin was hydroformylated under the usual conditions, in the autoclave described in Example V. 300 grams of water were then added and the product of the OXO reaction was then treated in the presence of water gas under a pressure of 120 kg. per sq. cm. for 45 minutes at 140° C. After emptying the autoclave, it was found that the aqueous layer was rose colored and the OXO product was a light brown. It was found by analysis that 87% of the cobalt used was contained in the aqueous layer, and that 13% had remained in the organic product. By treatment of the aqueous layer with 10% sulfuric acid, it was possible to volatilize 49% of the cobalt in the form of cobalt hydrocarbonyl, whilst 51% remained in the aqueous solution in the form of sulphate. Thus, it was only possible to recycle 42% of the cobalt used, in the form of hydrocarbonyl;

(b) By an aqueous solution of baryta: 600 grams of the same olefin were charged with cobalt hydrocarbonyl and hydroformylated in the same manner as under (a) above. 300 cu. cm. of a solution of baryta containing 5 grams of barium hydroxide were then added, and a treatment of the OXO product was then carried out in the presence of water gas at 120 kg. per sq. cm. for 45 minutes at 140° C. In this test, the aqueous layer was colorless and the organic product had a light yellow color. It was found by analysis that 96% of the cobalt had passed into the aqueous layer. By treatment with sulfuric acid of the aqueous layer 98% of the cobalt contained was carried away and dissolved in olefins in the form of hydrocarbonyl. It was thus possible to recycle 93% of the cobalt employed, in the form of cobalt hydrocarbonyl, into the OXO reaction.

EXAMPLE IX.—COMPARISON OF THE EFFECTIVENESS OF VARIOUS CHEMICAL SUBSTANCES IN CONNECTION WITH THE CATALYST CYCLE

A product of hydroformylation obtained from an industrial OXO synthesis and containing 1.63 grams of cobalt in the dissolved state was treated in an autoclave in the presence of water and synthesis gas, by chemical substances of different nature: dolomite, magnesium, zinc carbonate.

The following conditions were employed: 700 grams of OXO product, 300 cu. cm. of water, synthesis gas (45% CO; 49% $H_2$); 170 kg. sq. cm.; 45 minutes at 145° C;

(a) 10 grams of dolomite in powder;
(b) 4 grams of powdered magnesium;
(c) 5 grams of zinc carbonate;
(d) Without any addition of a chemical substance.

After each test, the cobalt which remained in the OXO product was determined, and by a treatment with sulfuric acid a study was made to find how much cobalt existing in the aqueous solution could be converted to cobalt hydrocarbonyl.

The table given below contains the analytical results:

| Chemical agent | Cobalt remaining in the OXO product, mg./kg. | Cobalt extracted from the OXO product, percent | Cobalt volatilized from the aqueous extract, percent | Efficiency of the cycle, percent |
|---|---|---|---|---|
| Dolomite, 19 g | 25 | 98.5 | 97.9 | 96.4 |
| Magnesium, 10 g | 50 | 97.0 | 99.7 | 96.7 |
| Zinc carbonate, 5 g | 152 | 90.7 | 66.1 | 59.9 |
| Water alone | 120 | 92.7 | 64.3 | 59.6 |

EXAMPLES X-XIV 700 grams of heptenes (propylene and butylene codimers) containing 1.6 grams of cobalt in the form of di-cobalt-octacarbonyl were hydroformylated in a stainless steel autoclave of two liters capacity, with magnetic agitation, at a constant pressure of 160 kg./cm.² and a temperature comprised between 125° and 160° C.

The de-cobaltation was performed in the same autoclave, without removal of the product, by introducing, through a lock, 175 ml. of water containing the de-cobaltation agent and vigorously agitating the OXO product for 30 minutes at the temperature and pressure chosen for that particular test.

Afer cooling the autoclave and venting the gas, the reaction products were drawn off into a decanting bulb, where, upon separating the aqueous layer, the organic product was washed three times with 175 ml. of water.

The following measurements were made:

(1) The cobalt remaining in the OXO product after de-cobaltation and three washings with water;
(2) The total cobalt in the form of the hydrocarbonyl anion [Co(CO)₄] in the aqueous extract coming from the de-cobaltation and to which extract was added the water from the first washing of the OXO product, and
(3) The cobalt in the water coming from the other two washings.

No attempt was made to recover all of the reaction products so that the yield determination is made, based on the cobalt contained in the amount of product recovered, which was about 70% of the total product. Since all examples were conducted under similar circumstances of product recovery, the results of use of different temperatures, pressures and de-cobaltation agents can be compared.

OPERATING CONDITIONS AND ANALYTICAL RESULTS OF THE DE-COBALTATION. TESTS PERFORMED ON OXO PRODUCTS OBTAINED BY HYDROFORMYLATION OF 700 GRAMS OF HEPTENES

| De-cobaltation agent: | X | XI | XII | XIII | XIV |
|---|---|---|---|---|---|
| Kind | $Na_2CO_3$ | | | $Na_2HPO_4$ | $Na_2(COO)_2$ |
| Amount (g.) | 1.75 | 1.75 | 1.74 | 12 | 2.2 |
| Stoichiometric excess with respect to CO (percent) | 19 | 14 | 15 | 150 | 21 |
| Operating conditions: | | | | | |
| Temperature (° C.) | 150 | 150 | 206 | 150 | 150 |
| Pressure (kg./cm.$_2$) | 160 | 240 | 160 | 160 | 160 |
| Analysis: | | | | | |
| Co in the OXO product (mg.) | 1,640 | 1,661 | 1,672 | 1,590 | 1,599 |
| Co in the OXO product after de-cobaltation and three washings (mg.) | 18 | 15 | 55 | 38 | 84 |
| Co in the aqueous extract + the 1st washing (mg.) | 1,240 | 1,158 | 1,094 | 1,100 | 863 |
| Co in the 2nd + 3rd washings (mg.) | 3 | 14 | 23 | 7 | 41 |
| Co recovered from the total (mg.) | 1,261 | 1,182 | 1,172 | 1,145 | 988 |
| Co in the aqueous extract in the form of [Co(CO)$_4$] | 1,188 | 1,153 | 771 | 1,082 | 850 |
| Percent recovery | 96 | 99 | 70 | 93 | 92 |

*Concluding discussion.*—Since the methods entailing the decomposition of the cobalt carbonyls are most frequently used in the catalyst cycle, the results of one such method, as utilized in industry, can be compared with those, likewise utilized in industry, of the present method of the invention using a catalyst cycle without destruction of the carbonyl complex.

In thermally de-cobalting the products of hydroformylation containing cobalt carbonyls, it is inevitable that a certain quantity of precipitated cobalt will deposit on the walls of the reactor. These deposits, often strongly adherent, must be periodically removed to avoid plugging and to assure a thermal path for the heating means. The accumulation of cobalt in the reactor renders the catalyst cycle irregular and its use difficult.

The operation for separating the precipitated cobalt from the organic product (filtration or centrifugation) are likewise difficult and costly, requiring much labor and resulting in a considerable loss of cobalt.

Particularly expensive are the chemical treatments of the cobalt mud, necessary to return the cobalt to its initial state (cobalt oxide, cobalt salt of an organic acid, for example).

Contrary to this, at no time in the inventive process is the cobalt in a solid state. Consequently, the expense of cleaning the de-cobalter, separating the precipitated cobalt, and recovering the organic products from the mud is eliminated.

Since the active part of the catalyst, the cobalt tetracarbonyl complex, remains rigorously conserved, the regeneration of the catalyst is inexpensive. It can be effected continuously, using very inexpensive raw materials.

Finally, because of the operation in closed circuit, the cobalt losses are relatively small.

Because of this favorable operation, the industrial exploitation of the catalyst cycle, based on extracting cobalt carbonyls of sodium carbonate or other reactants herein described and regenerating the catalyst (from the formed salt of cobalt hydrocarbonyl) by the action of sulfuric acid, is remarkably economical compared with the known process described above.

According to actual experiments, the cost of the inventive process is less than 20% of the heat treatment process.

While in the foregoing description the term "cobalt hydrocarbonyl" is utilized, it is appreciated that other carbonyl compounds of cobalt may be present during the process, such as complexes of cobalt carbonyls with olefins or organic oxygenated compounds. It is therefore understood that the term "carbonyl compounds of cobalt" utilized in the claims includes cobalt hydrocarbonyl as well as such other carbonyl compounds of cobalt.

While I have set forth certain specific examples and preferred modes of practice of my invention, it will be understood that this is solely for illustration and that various changes and modifications may be made in the invention without departing from the spirit of the disclosure or the scope of the appended claims.

I claim:

1. In a hydroformylation process wherein an olefinic compound is reacted with carbon monoxide and hydrogen in the presence of a carbonyl compound of cobalt as a catalyst to produce a reaction mixture containing a carbonyl compound of cobalt and an aldehyde having one more carbon atom than the olefinic compound, cobalt-containing material is recovered from the reaction mixture and recovered cobalt-containing material is recycled to the hydroformylation process, the improvement which comprises intimately contacting the reaction mixture having the carbonyl compound of cobalt therein at a temperature of between about 20° C. and 250° C. and at a pressure of at least atmospheric with from between 10% and 100% by volume of said organic liquid of an aqueous medium containing at least one substance selected from the group consisting of the oxides, hydroxides and salts of the alkali and alkaline earth metals to form a water soluble cobalt compound which has the cobalt present substantially entirely in the anionic portion of the molecule and dissolved in the aqueous medium, separating the aqueous medium containing the dissolved cobalt compound from the reaction mixture, adding a strong mineral acid to the aqueous medium to produce a volatile carbonyl compound of cobalt, thereafter passing gas inert to the volatile carbonyl compound of cobalt through the aqueous medium to recover the carbonyl compound of cobalt in volatile form in the gas, and recycling the recovered carbonyl compound of cobalt to the hydroformylation process to catalyze the reaction.

2. The process of claim 1 wherein the aqueous medium contacted with the reaction mixture contains sodium carbonate.

3. The process of claim 1 wherein the aqueous medium contacted with the reaction mixture contains sodium bicarbonate.

4. The process of claim 1 wherein the aqueous medium contacted with the reaction mixture contains sodium hydroxide.

5. The process of claim 1 wherein the aqueous medium contacted with the reaction mixture contains barium hydroxide.

6. The process of claim 1 wherein the aqueous medium contacted with the reaction mixture contains dolomite.

7. The process of claim 1 wherein the gas containing said volatile compound of cobalt is intimately contacted with a liquid olefinic compound to absorb the carbonyl compound of cobalt and wherein the liquid olefinic compound and absorbed carbonyl compound of cobalt is passed to the hydroformylation process.

8. The process of claim 1 wherein said contacting of the aqueous medium with the reaction mixture is effected in the presence of carbon monoxide and hydrogen present in the reaction mixture at a pressure of 1–500 kgs./sq. cm., the reaction mixture after separation from the aqueous medium is washed with water and at least a portion of the wash water is thereafter added to the said aqueous medium.

9. The process of claim 1, in which said substance contained in said aqueous medium is employed in at least a slight stoichiometric excess with respect to the quantity of cobalt present in the reaction mixture having the carbonyl compound of cobalt therein.

10. The process of claim 1, wherein the said substance contained in the aqueous medium is present in the form of a fixed bed.

11. The process of claim 1, wherein said substance contained in the aqueous medium is employed in the form of a suspension in said aqueous medium.

12. A process for recovery of a carbonyl compound of cobalt present in a water insoluble organic liquid comprising intimately contacting at a temperature of between about 20° C. and 250° C. and at a pressure of at least atmospheric the organic liquid having a carbonyl compound of cobalt present therein with from between 10% and 100% by volume of said organic liquid of an aqueous medium containing at least one substance selected from the group consisting of the oxides, hydroxides and salts of the alkali and alkaline earth metals to form a water soluble cobalt compound which has the cobalt present substantially entirely in the anionic portion of the molecule and dissolves in the aqueous medium, separating the aqueous medium containing the dissolved cobalt compound from the organic liquid, adding a strong mineral acid to the aqueous medium to produce an aqueous mixture including a carbonyl compound of cobalt, separating as formed said carbonyl compound of cobalt from said acidified aqueous mixture by passing a gas inert to the volatile carbonyl compound of cobalt so formed by said acidification of said aqueous medium containing the dissolved cobalt compound, separating said inert gas containing said volatile carbonyl compound of cobalt and recovering the carbonyl compound of cobalt in volatile form in said inert gas.

13. The process of claim 12 wherein said volatile carbonyl compound of cobalt in said inert gas is passed through an organic solvent for the carbonyl compound of cobalt and a solution of the carbonyl compound of cobalt in an organic solvent is recovered.

14. The process of claim 12 wherein the organic liquid is an organic reaction mixture produced by an organic reaction which is catalyzed by a carbonyl compound of cobalt and wherein said recovered carbonyl compound of cobalt in volatile form is recycled to the organic reaction.

15. A process for recovery of a carbonyl compound of cobalt present in a water insoluble organic liquid comprising intimately contacting at a temperature of between about 20° C. and 250° C. and at a pressure of at least atmospheric the organic liquid having a carbonyl compound of cobalt present therein with from between 10% and 100% by volume of said organic liquid of an aqueous medium containing at least one substance selected from the group consisting of the oxides, hydroxides and salts of the alkali and alkaline earth metals to form a water soluble cobalt compound which has the cobalt present substantially entirely in the anionic portion of the molecule and dissolves in the aqueous medium, separating the aqueous medium containing the dissolved cobalt compound from the organic liquid, adding a strong mineral acid to the aqueous medium to produce an aqueous mixture including a carbonyl compound of cobalt, separating as formed said carbonyl compound of cobalt by intimately contacting said acidified aqueous mixture including said carbonyl compound of cobalt with an organic solvent for the carbonyl compound of cobalt to produce a solution of said carbonyl compound of cobalt therein and separating said solution of said carbonyl compound of cobalt from said acidified aqueous mixture.

16. The process of claim 15 wherein the organic liquid is an organic reaction mixture produced by an organic reaction which is catalyzed by a carbonyl compound of cobalt and wherein said recovered solvent solution of said carbonyl compound of cobalt is recycled to the organic reaction.

17. A process for recovery of a carbonyl compound of cobalt present in a water insoluble organic liquid comprising intimately contacting at a temperature of between about 20° C. and 250° C. and at a pressure of at least atmospheric the organic liquid having a carbonyl compound of cobalt present therein with from between 10% and 100% by volume of said organic liquid of an aqueous medium containing magnesium to form a water soluble cobalt compound which has the cobalt present substantially entirely in the anionic portion of the molecule and dissolves in the aqueous medium, separating the aqueous medium containing the dissolved cobalt compound from the organic liquid, adding a strong mineral acid to the aqueous medium to produce an aqueous mixture including a carbonyl compound of cobalt, separating as formed said carbonyl compound of cobalt from said acidified aqueous mixture by passing a gas inert to the volatile carbonyl compound of cobalt so formed by said acidification of said aqueous medium containing the dissolved cobalt compound, separating said inert gas containing said volatile carbonyl compound of cobalt and recovering the carbonyl compound of cobalt in volatile form in said inert gas.

References Cited by the Examiner

UNITED STATES PATENTS

| 2,811,567 | 10/57 | Mason | 260—604 |
| 2,820,067 | 1/58 | Mertzweiller et al. | 260—604 |
| 2,845,465 | 7/58 | Cull et al. | 260—604 |

FOREIGN PATENTS

| 742,879 | 1/56 | Great Britain. |
| 1,223,381 | 2/60 | France. |

LEON ZITVER, *Primary Examiner.*